June 4, 1957 — L. S. SULLIVAN — 2,794,653
PASSENGER SAFETY HARNESS FOR VEHICLES
Filed Sept. 19, 1955
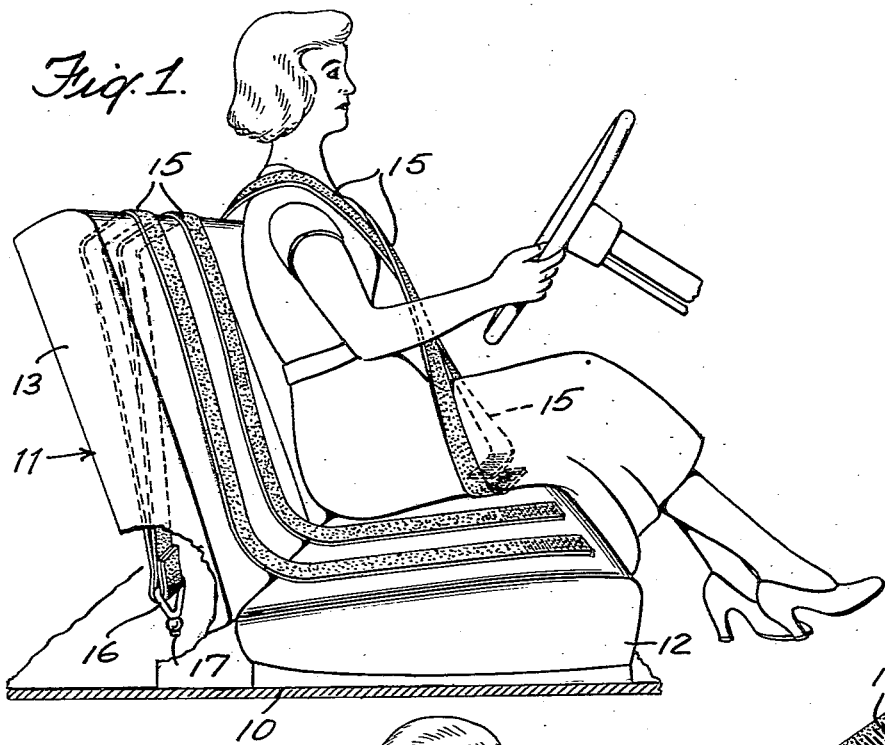
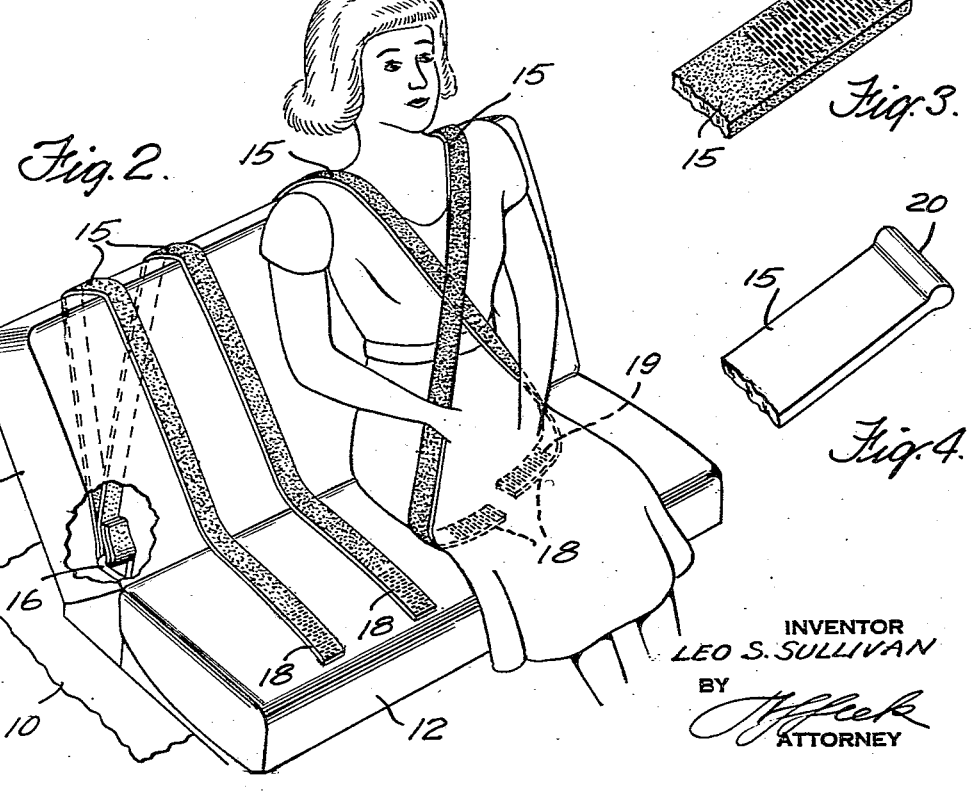
INVENTOR
LEO S. SULLIVAN
BY
ATTORNEY

United States Patent Office 2,794,653
Patented June 4, 1957

2,794,653
PASSENGER SAFETY HARNESS FOR VEHICLES

Leo S. Sullivan, Pelham, N. Y., assignor to The Russell Manufacturing Company, Middletown, Conn., a corporation of Connecticut Application September 19, 1955, Serial No. 535,007

2 Claims. (Cl. 280—150)

This invention relates to a safety harness for vehicles and more particularly to a seat belt having novel and improved characteristics which is suitable for use in passenger automobiles.

An object of the invention is to provide a seat belt of the above type which is easy to adjust and to use and which is automatically released when the vehicle has come to rest.

Another object is to provide a seat belt of the above type which can be readily installed in existing vehicles without marring the upholstery.

Another object is to provide a belt of the above type which is constructed and arranged to minimize the natural reluctance of the passenger to take advantage of the safety equipment.

Various other objects and advantages will be apparent as the nature of the invention is more fully disclosed.

The invention will be better understood by referring to the following description, taken in connection with the accompanying drawings wherein a specific embodiment has been set forth for purposes of illustration.

In the drawings:

Fig. 1 is a longitudinal section through a portion of an automobile showing a safety seat belt embodying the present invention;

Fig. 2 is a partial front elevation looking somewhat down onto the front seat of the automobile; and Figs. 3 and 4 are detail views illustrating the construction of the seat belt.

Referring to the drawings more in detail, the invention is shown as applied to an automobile having the usual floor boards 10 and having a front seat 11 of usual construction with a seat cushion 12 and a back 13.

In accordance with the present invention the safety harness comprises a pair of straps 15 which are secured at one end to a metal ring 16 which is anchored in the floor board 10 in a position directly in back of the passenger by means of a bolt 17. The two straps 15 are of a length to extend upwardly in back of the seat back 13 and normally lie over the front of the seat back 13 and on the seat cushion 12 as indicated in Fig. 1.

The harness is duplicated for each passenger. In the case of the rear seat the straps may be anchored inside of the car trunk and extend upwardly through slits in the rear ledge and over the seats. In any case the ends of the straps 15 are anchored in a rigid portion of the automobile chassis which is suited to withstand the strain which may be imposed thereon in the event of an accident.

The safety belt is used by passing the straps 15 over the two shoulders of the passenger, crossing the straps in front as shown in Fig. 2 and tucking the loose ends 18 of the straps under the thighs so that in normal position the passenger rests on the ends 18 of the straps and holds the same securely in place. The ends 18 are preferably placed under the thighs near the front of the seat cushion 12. In this position they do not interfere with the comfort of the passenger during the normal operation of the vehicle. However, in case of sudden stoppage the body tends to be thrown forward, thereby depressing the thighs and increasing the pressure exerted upon the ends 18 of the straps. The natural tightening of the muscles assists in holding the straps in place. The straps are effective at the instant of an emergency but do not interfere with the movements of the passenger during normal operation of the vehicle.

The ends of the straps may be provided with a friction surface such as woven elastic threads 19 as indicated in Fig. 3 to increase the grip of the thighs upon the straps during an emergency. The ends 18 may also be made with a rounded bead 20 as indicated in Fig. 4 for the same purpose although it is usually found that the surface of a woven strap of the type normally used for safety belts in airplanes presents sufficient friction for the purpose.

It will be noted that in the above system the straps normally rest upon the back of the seat where they cannot fall upon the floor and become soiled. They are also readily available for use when required.

In case of an emergency involving sudden stoppage of the vehicle the shoulders tend to be thrown forward and exert pressure upon the straps 15. However, this pressure is resisted by the anchorage of the straps into the floor of the car. The grip of the thighs on the ends 18 of the belt is sufficient to hold the straps in place and to oppose the forward thrust of the shoulders. Hence the safety belt as above described serves not only to hold the body in place but to prevent the upper part of the body from being thrown forward and hitting the windshield or the steering wheel.

A further advantage of the safety belt arranged as above described is that after the accident, when the vehicle has come to rest, the belt is automatically released and hangs loose so as not to impede the escape of the passenger from the vehicle. This is particularly important in the case of an accident when the passenger may be injured and may not have the free use of his hands for releasing a belt buckle.

By anchoring the straps to the floor or other part of the vehicle frame as shown the harness may be readily attached to existing vehicles without marring the upholstery or the finish of the seats. In new cars however the straps may be anchored to brackets attached to the backs of the seats if desired. Of course a single strap may be used to extend over one shoulder only although a pair of straps as shown is usually preferred.

The arrangement above described is applicable to various types of vehicles such as automobiles, buses, railway cars or airplanes and has been shown as applied to a passenger automobile for purposes of illustration only.

What is claimed is:

1. In combination with a vehicle having a frame and a seat composed of a back and a seat cushion secured to said frame, a safety harness comprising a strap having one end anchored to said frame in back of said seat and of a length to extend over the shoulder of a passenger in said seat, to cross in front of the passenger and having a free end to be tucked under the thighs of the passenger for gripping between the thighs and the seat cushion, said strap having at said last end a friction surface to improve the grip thereon by the thighs.

2. A safety harness for vehicles having a seat for a passenger comprising a pair of straps secured together at one end to a fitting adapted to be attached to the vehicle in back of said seat, said straps being of a length to pass over the shoulders of the passenger, to cross in front of the passenger, and having free ends to be tucked under the thighs of the passenger for gripping thereby, said free ends having friction surfaces to improve said gripping.

(References on following page)

References Cited in the file of this patent

UNITED STATES PATENTS

| | | |
|---|---|---|
| 2,292,386 | Manson | Aug. 11, 1942 |
| 2,365,625 | Carlisle | Dec. 19, 1944 |
| 2,365,626 | Carlisle | Dec. 19, 1944 |
| 2,680,476 | Saffell | June 8, 1954 |
| 2,710,649 | Griswold | June 14, 1955 |

OTHER REFERENCES

Howe: Article on "Safety Belts" in magazine Ford Field, September 1954, vol. 56, No. 9; pp. 16–34.